Figure 1:
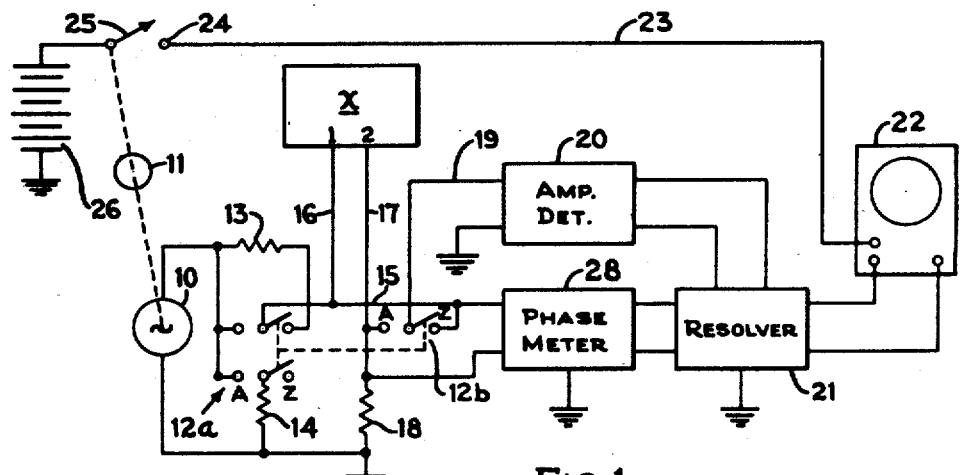

May 12, 1959      J. H. PROBUS      2,886,774
VECTOR LOCUS PLOTTERS
Filed Oct. 5, 1955

INVENTOR.
JAMES H. PROBUS
BY
ATTYS.

United States Patent Office 2,886,774
Patented May 12, 1959

2,886,774
VECTOR LOCUS PLOTTERS

James H. Probus, Falls Church, Va., assignor, by mesne assignments, to the United States of America as represented by the Secretary of the Navy Application October 5, 1955, Serial No. 538,815

8 Claims. (Cl. 324—57)

This invention relates to vector locus plotters and more particularly to recordation plotting of the transfer functions or the admittance and impedance characteristics over a wide frequency range of unknown impedance elements.

In prior known devices for recording the impedance of unknown impedance elements, bridge networks, voltmeter-ammeter networks, or circuits utilizing phasemeters, power vector meters, power meters, or thermocouple instruments were employed. These devices, for the most part, were time consuming in operation and required considerable effort to use. Automatic methods or means based upon these fundamental devices have been devised and used with some success over limited frequency ranges, but a major difficulty in constructing these electronic systems has been that of resolving the polar coordinates of the vector in terms of rectangular coordinates over a wide range of frequency. This difficulty is at least a partial consequence of the difficulty of electronically producing a constant phase shift over a wide frequency range.

In the present invention a variable frequency generator is utilized to energize an unknown impedance element and a transfer function as a voltage, representative of the admittance, or a voltage, representative of the impedance, is electrically obtained from the impedance element which, together with the phase angle relation of the current and voltage applied to the unknown impedance element, produce polar coordinates of the transfer function, admittance, or impedance. These polar coordinate voltages are coupled to a resolver which resolves the polar coordinates into rectilinear coordinates for recordation on an instrument such as an oscilloscope, or the like. This vector plotting system employs commercially available components or elements such as a variable frequency or wide range oscillator, a wide frequency range phasemeter, linear amplifiers and linear detectors, an electromechanical resolver of the type used in computer designs, and either an oscilloscope, rectilinear recorder, or polar plotter, as is desired. If a polar plotter is desirable or available it can be used to serve the dual purpose of resolver and recorder. While these different recording devices may be utilized in this system, an oscilloscope is shown and described herein for the purpose of illustrating the invention. It is therefore a general object of this invention to provide a device for automatically recording the transfer functions including the admittance or impedance characteristics of an unknown impedance element over a wide frequency range with the use of an electromechanical resolver capable of converting polar coordinates into rectilinear coordinates.

Figure 2:
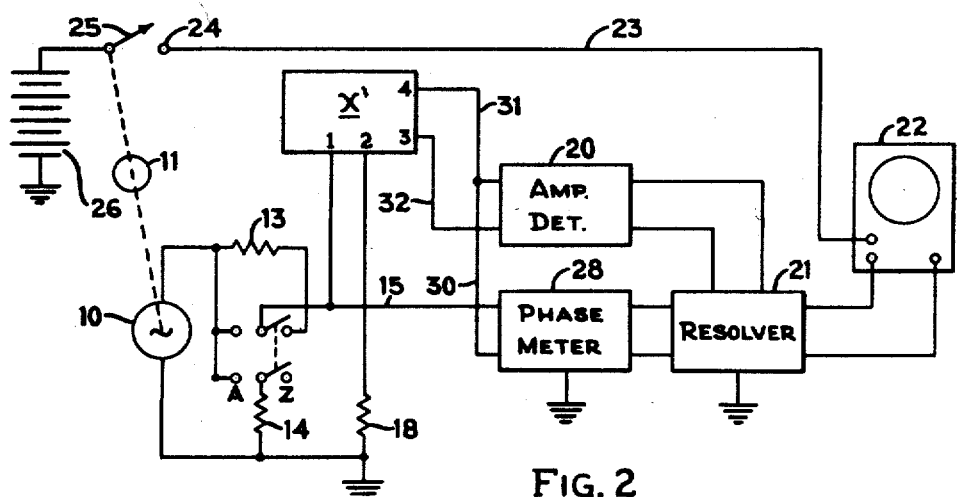

These and other objects, advantages, features, and uses will become more apparent as the description of the invention proceeds when considered together with the accompanying drawing, in which:

Fig. 1 is a schematic circuit and block diagram of the invention for recording impedance or admittance characteristics of a two-terminal impedance element, and Fig. 2 is a schematic block and circuit diagram of the invention illustrated in Fig. 1 adapted for four-terminal impedance elements.

Referring more particularly to Fig. 1, a conventional alternating current generator or oscillator 10, that will produce a sinusoidal electrical signal having no distortion or harmonic content, is driven by a motor 11 which is controllable in speed to produce variable frequency output of the generator 10. The generator 10 has one lead grounded and the other, or positive, lead connected to the two A poles of a double-throw-double-pole switch section 12a herein illustrated as the A throw position. The positive terminal of the generator 10 is likewise coupled through a fixed resistor 13 to one other pole of the switch section 12a identified herein as the Z throw position. The switch section 12a switch blade is mechanically coupled to the switch blade of a single-pole-double-throw switch section 12b also having A and Z throw positions corresponding to the throw positions A and Z of switch section 12a. When the switch sections 12a–b, hereinafter referred to as switch 12, is thrown to the A position, admittance recordings will be made, and when thrown to the Z position, impedance recordings will be made, as will later become clear. The lower switch blade of switch section 12a is coupled through a fixed resistor 14 to the grounded side of the generator 10. The upper switch blade of switch section 12a is coupled by conductor 15 to the Z pole of switch section 12b and by conductor 16 to terminal 1 of an unknown impedance element $x$. Terminal 2 of impedance element $x$ is coupled by conductor 17 through a fixed resistor 18 to the grounded side of the generator 10. Terminal 2 of the unknown impedance element $x$ is likewise coupled via conductor 17 to the A pole of switch section 12b. The fixed resistor 13 is of a higher impedance than the unknown impedance element $x$ while the fixed resistors 14 and 18 are each of lower impedance than the unknown impedance element $x$. As may be seen from the foregoing, in the A position of switch 12 the positive terminal of the generator 10 will be directly connected to terminal 1 of the unknown impedance element $x$ and the fixed resistor 14 will be placed in parallel with the generator 10, which resistor 14 will be in parallel with the unknown impedance element $x$ and fixed resistor 18 in series. In the Z position of switch 12 the fixed resistor 13 will be in series with the unknown impedance element $x$ and the resistance element 18.

When switch 12 is in the Z position the magnitude of the voltage difference between terminal 1 of the unknown impedance element $x$ and ground is proportional to the magnitude of the impedance of element $x$ over the frequency range of the measurements since the current through $x$ remains nearly constant. This is true because of the fact that resistor 13 is large with respect to the impedance of element $x$ and resistor 18 is low with respect thereto whereby the resistance of resistor 13 substantially controls the current in this series circuit and the variation of the impedance of element $x$ with a change in frequency has a negligible effect on the current flow in the circuit. It may now become evident that as the input frequency changes impedance element $x$ will change in value in like manner and the voltage appearing across it and the resistor 18 will be proportional to the impedance of element $x$. Since resistor 18 is of a relatively low value it introduces negligible error.

It is not feasible to measure a wide range of impedance values with equal accuracy by maintaining a constant current through the unknown impedance element. The constant current method is used when the unknown impedance element $x$ varies from a fraction of an ohm to several thousand ohms. When the impedance element $x$ exceeds the upper value, the preferred procedure is to maintain a constant R.M.S. voltage level across the terminals of the known impedance element $x$ as the frequency of the applied signal is varied. This is accomplished by throwing switch 12 to the A position. In this position resistor 14 forms one leg of the parallel combination and, as pointed out previously, has an ohmic resistance considerably less than the resistance of the unknown element $x$. Element $x$ is in series with resistor 18, the ohmic resistance of which is substantially the same as resistor 14, and both are in parallel combination with resistor 14. Due to the fact that oscillator generators are not ordinarily constant voltage sources, resistor 14 is connected across the output to provide an effective low impedance load for the generator 10 in order to keep the voltage across element $x$ and the resistor 18 constant. If a constant voltage generator 10 is used, the resistor 14 is not necessary and may be omitted. Since the voltage across the unknown impedance element $x$ and the resistor 18 is held constant, the principle applicable to low impedances is not here applicable since the voltage across the combination never changes with a change of impedance of element $x$. As the impedance of element $x$ increases, however, due to an increase in frequency the voltage drop across it increases and the voltage drop across resistor 18 decreases; that is, the voltage drop across resistor 18 varies inversely with the voltage drop across the unknown impedance element $x$. It may therefore be understood that the magnitude of the voltage appearing across resistor 18 is proportional to the magnitude of the admittance of the unknown impedance element $x$ which is the reciprocal of the magnitude of the impedance of the unknown impedance element $x$. The voltage drop across resistor 18 is utilized because it is easier to manipulate than the voltage across the unknown impedance element $x$. It may now appear apparent that when switch 12 is in the Z position to measure a relatively low impedance a voltage representative of impedance may be obtained from the unknown element $x$ while with the switch 12 in the A position a voltage representative of the admittance of the unknown impedance element $x$ may be obtained.

A phasemeter 28 of any conventional design of the type to determine the phase angle between current and voltage as set out in the Electrical Engineer's Handbook by Pender and Del Mar, fourth edition, section 5—39 and in volume 21 of Radiation Laboratory Series by the Massachusetts Institute of Technology, section 12—12, is suitable. This phase meter which must be capable of handling a wide range of frequencies has one input coupled to the terminal 1 of the unknown impedance element $x$ and the other input coupled to terminal 2 of element $x$. The phasemeter 28 preferably should have a high input impedance in each of its input channels, it should operate substantially independently of the R.M.S. level of the input signal, and it should be substantially accurate over the frequency range of interest. As is well known in the art, when a voltage across an impedance and a voltage in phase with the current through said impedance are properly integrated as is done in a conventional phasemeter, an output voltage may be obtained that is proportional to the phase angle between the current through element $x$ and the voltage appearing across it. The output signal of phasemeter 28 is therefore an electrical signal the value of which is substantially proportional to the phase angle between the current and voltage impressed upon the unknown impedance element $x$.

The switch blade of switch section 12$b$ is coupled by a conductor 19 to an amplifier-detector circuit 20 of conventional design. The amplifier-detector should be linear in operation and should introduce little or no distortion. When the switch 12 is in the Z position a voltage having a magnitude proportional to the magnitude of the impedance of the unknown impedance element $x$ is fed into the amplifier-detector circuit 20, and when the switch 12 is in position A a voltage having a magnitude proportional to the magnitude of the admittance of the unknown impedance element $x$ is fed into the amplifier-detector circuit 20. The output of the amplifier-detector 20 is a direct current voltage proportional to the magnitude of its input voltage, or proportional to the magnitude of the admittance or impedance of the unknown impedance element $x$.

The outputs of both the phasemeter 28 and the amplifier-detector circuit 20 are fed into an electromechanical resolver 21. This resolver may be of a known type as disclosed in texts, for example, in volume 17 of the Radiation Laboratory Series by the Massachusetts Institute of Technology, sections 10—12 to 10—14, but is preferably of the type particularly adapted for computers. It may be understood that these two inputs provide the polar coordinates of the impedance or admittance, as the case may be, of the unknown impedance element $x$; that is, the phasemeter 28 provides a voltage signal proportional to the relative phase angle of the current through and voltage across the element $x$ while the output of the amplifier-detector circuit provides a voltage signal proportional to the magnitude of the admittance or impedance of the unknown impedance element $x$. The resolver 21 resolves the polar coordinates into rectilinear coordinates, as is well understood in the art, the output of which are voltages representative of these rectilinear coordinates that are fed into the deflection circuits of an oscilloscope 22, or other recording device. The oscilloscope 22, or like device, should have a high input impedance in its deflection channels to avoid any disruption of any rectilinear voltage signals.

The oscilloscope 22 may also have a circuit brightness means established through a conductor 23 to a contact 24 of a rotary contact device 25 driven by the variable motor 11. The rotatable contact 25 is directly coupled to a direct current voltage source 26, as may be well understood in the art. The switch 24—25 may be any low noise electrical switch which is normally open but which is closed momentarily by rotation of the motor 11. Where desirable, a speed reduction means may be utilized between the motor 11 and the rotatable contact 25. This produces periodic closure of the switch 24—25 in synchronism with the given change in frequency of the generator 10 which causes a D.C. electrical signal to be periodically applied to the oscilloscope to increase the brightness of the electron beam trace to provide an indication of a desired frequency interval, as may well be understood in the art.

Once the system is assembled as illustrated and described herein it is necessary only to calibrate the system by using a standard component having known impedance and admittance characteristics as a function of frequency. With known or standard components the proper position of vector impedance and admittance plots may be made. The recording element, as the oscilloscope 22, may then be calibrated in terms of the plot and the known coordinates of the plot. The standard impedance element may then be removed and an unknown impedance element inserted for analysis.

In the operation of the device the speed of motor 11 may be made to vary over a desired frequency range and, with an unknown impedance element $x$ of substantially low impedance connected, the switch 12 may be thrown to the Z position which will produce a linear vector plot on the oscilloscope 22 of the impedance characteristics of the element $x$ throughout the desired frequency range. For measuring the admittance of an impedance element for a substantially high impedance the switch 12 is thrown to the A position to provide a linear vector plot on the oscilloscope of the admittance characteristics of the unknown impedance element $x$. These may then be compared with the calibrations provided on the oscilloscope 22.

Referring to Fig. 2, where like reference characters identify like parts, the circuit is slightly rearranged to accommodate a four-terminal unknown impedance element such as electrical networks or systems involving amplifiers, filters, and the like. In Fig. 2 terminals 1 and 2 of the unknown impedance element $x'$ are coupled as inputs similar to the coupling of terminals 1 and 2 of the impedance element $x$ in Fig. 1. The conductor 15 couples the terminal 1 of $x'$ to one input channel of the phasemeter 28 as in Fig. 1 but the other input channel to phasemeter 28 is coupled directly to the output terminal 4 of the impedance element $x'$ by a conductor 30. Terminal 4 is likewise coupled to one input terminal of the amplifier circuit 20 by a conductor 31. Terminal 3 of the unknown impedance element $x'$ is coupled to the other terminal of the amplifier-detector circuit 20 by a conductor 32. Switch section 12b is not necessary in this modification.

The operation of the circuit shown in Fig. 2 is substantially identical to that in Fig. 1 to obtain the transfer function characteristic plots of the four-terminal impedance element $x'$.

While many modifications and changes may be made in the constructional details and features or circuit arrangement of this invention, it is to be understood that I desire to be limited only by the scope of the appended claims. For example, if a resolver is used which provides alternating current output signals, an additional amplifier-detector circuit may be used for producing rectilinear coordinate voltage signals applicable to an oscilloscope or a rectilinear plotter. Likewise, if a polar plotter is available it can serve the dual purpose of the resolver and the recorder.

I claim:

1. A vector locus plotter comprising; a variable frequency generator, an unknown impedance coupled to said generator through a first resistance; a phasemeter having its inputs coupled across said unknown impedance element for providing phase angle signals of the current and voltage impressed on said unknown element by said generator; switchable coupling means associated with said frequency generator and said unknown impedance element, said means having one position to couple a second resistance between said generator and said unknown impedance element for controlling the current through said unknown impedance element, and having another position to couple a third resistance in shunt across said generator for controlling the voltage across the unknown impedance element; means coupled to said unknown impedance element to provide voltage signals representative of the transfer functions thereof; and means combining said phase angle signals and said transfer function voltage signals for recordation of the transfer function characteristics.

2. A vector locus plotter as set forth in claim 1 wherein said means combining said phase angle signals and said transfer function voltage signals comprise a rectilinear resolver and recorder means.

3. A vector locus plotter as set forth in claim 1 wherein said means to provide voltage signals is an amplifier and detector circuit.

4. A vector locus plotter as set forth in claim 1 wherein said means to provide voltage signals representative of the transfer function is an amplifier and detector circuit, and said means combining said phase angle signals and said transfer function voltage signals is an electromechanical rectilinear resolver coupled to a recording device.

5. An automatic vector locus plotting device comprising; a variable frequency wide range generator; an unknown impedance element coupled to said generator; a first resistor in said coupling in series with said unknown impedance element; a phasemeter having its inputs connected across said unknown impedance element for producing phase angle signals of the current and voltage impressed on said element; a detector circuit; a switchable coupling means associated with said coupling between said generator and said unknown impedance element, with said unknown impedance element, and with said detector circuit, said means in one switched condition coupling a second resistor between said generator and said unknown impedance element for controlling current through said unknown impedance element and in the same switched condition coupling said detector circuit to said second resistor and across said unknown impedance element and in another switched condition coupling said detector circuit across said first resistor and coupling a third resistor in shunt across said generator for controlling the voltage across the unknown impedance element, said detector producing from the unknown impedance element and resistor series combination voltages proportional to the transfer functions of said unknown impedance element; and resolver-recorder means coupled to said phasemeter and to said detector circuit for resolving said phase angle signals and said detector voltages for recordation of the transfer function characteristics of said unknown impedance element.

6. An automatic vector locus plotter as set forth in claim 5 wherein said resolver-recorder means is an electromechanical resolver coupled to an oscilloscope to visually display the transfer function characteristics by rectilinear plots.

7. An automatic vector locus plotting device comprising; a variable frequency wide range generator; an unkkknown impedance element coupled to said generator; a current controlling resistor switchable in and out of said coupling by a first switch, said first switch further switching a second resistor in parallel with said generator alternatively with said current controlling resistor; a third resistor in said coupling in series with said unknown impedance element; a phasemeter coupled across said unknown impedance element for providing phase angle signals from the current and voltage impressed on said element; an amplifier-detector circuit, said circuit being coupled through a second switch to said unknown impedance element which in one switched position connects relative to said current controlling resistor and in the other switched position connects relative to said third resistor providing admittance and impedance voltages respectively, the first and second switches being mechanically coupled to include said current controlling resistor in said one switched position and to include said second resistor in said other switched position; a resolver coupled to said phasemeter and to said amplifier-detector circuit for resolving said phase angle signals and said admittance and impedance voltages into rectilinear voltages; and a recorder means coupled to said resolver for rectilinearly recording the admittance and impedance characteristics of said unknown impedance element.

8. An automatic vector locus plotting device comprising; a variable frequency wide range generator; an amplifier-detector circuit; an unknown impedance having its input coupled to said generator and its output coupled to said amplifier-detector circuit; a current controlling resistor switchable serially in and out of the coupling between said generator and said unknown impedance by a switch and a voltage controlling resistor switchable in shunt to said generator by said switch, said current controlling and voltage controlling resistors being switchable alternately in circuit by said switch; a phasemeter coupled to said unknown impedance for producing phase angle angle signals from the current and voltage impressed on said unknown impedance; a resolver coupled to the output of said amplifier-detector circuit and to said phasemeter for resolving said phase angle signals and the detected voltages of said unknown impedance into rectilinear voltage co-ordinates; and a recorder means coupled to said resolver for recording the rectilinear voltage co-ordinates produced by each switched position of said switch whereby a recordation is made of the transfer function characteristics of said unknown impedance for controlled current and controlled voltages impressed thereon.

References Cited in the file of this patent
UNITED STATES PATENTS

| | | |
|---|---|---|
| 2,611,005 | Wilson | Sept. 16, 1952 |
| 2,735,064 | Salzberg | Feb. 14, 1956 |

UNITED STATES PATENT OFFICE
CERTIFICATE OF CORRECTION

Patent No. 2,886,774                                                   May 12, 19!

James H. Probus

It is hereby certified that error appears in the printed specificati of the above numbered patent requiring correction and that the said Lette Patent should read as corrected below.

Column 3, line 16, for "known" read -- unknown --; column 5, line 5C for "generator," read -- generator; --; column 6, line 44, for "unkknown" read -- unknown --; column 7, line 5, after "phase" strike out "angle".

Signed and sealed this 6th day of October 1959.

(SEAL)
Attest:

KARL H. AXLINE
Attesting Officer

ROBERT C. WATSON
Commissioner of Patent